(12) United States Patent
Wu

(10) Patent No.: US 6,553,895 B2
(45) Date of Patent: Apr. 29, 2003

(54) BREWING APPARATUS FOR ELECTRIC COFFEE MAKER

(75) Inventor: Tsan-Kuen Wu, Tainan Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 0 days.

(21) Appl. No.: 09/950,090

(22) Filed: Sep. 10, 2001

(65) Prior Publication Data
US 2003/0047080 A1 Mar. 13, 2003

(51) Int. Cl.[7] .................................................. A47J 31/34
(52) U.S. Cl. ........................ 99/289 R; 99/287; 99/302 P
(58) Field of Search ........................... 99/302 P, 289 R, 99/287, 295, 300, 297, 280

(56) References Cited

U.S. PATENT DOCUMENTS 4,852,472 A * 8/1989 In-Albon et al. ......... 99/289 R
5,275,089 A * 1/1994 Armellin ................... 99/289 R
6,129,006 A * 10/2000 Schmed ..................... 99/302 P

* cited by examiner

Primary Examiner—Reginald L. Alexander
(74) Attorney, Agent, or Firm—Ladas & Parry

(57) ABSTRACT

A brewing apparatus for an electric coffee maker includes a plunger unit and a sleeve unit, which can be driven by a driving unit to move horizontally on a machine base. When an unsealed chamber is defined among a coffee-discharging unit, the plunger unit and the sleeve unit, ground coffee beans can be fed into the unsealed chamber. Subsequently, a sealed chamber is defined among the coffee-discharging unit, the plunger unit and the sleeve unit such that the ground coffee beans are received within the sealed chamber, thereby permitting flow of hot water into the sealed chamber. Finally, the plunger unit and the sleeve unit are separated from the coffee discharging unit, thereby permitting dropping of consumed ground coffee from a space between the coffee-discharging unit and the assembly of the plunger unit and the sleeve unit.

4 Claims, 4 Drawing Sheets

BREWING APPARATUS FOR ELECTRIC COFFEE MAKER

BACKGROUND OF THE INVENTION

1. Field of the Invention

This invention relates to an electric coffee maker, and more particularly to a brewing apparatus for an electric coffee maker, which can receive and process ground coffee beans and hot water so as to discharge brewed coffee and consumed ground coffee therefrom.

2. Description of the Related Art

A conventional electric coffee maker that is found in coffee shops is generally provided with a brewing apparatus. When it is desired to brew coffee in the conventional electric coffee maker, a switch is actuated so as to feed automatically selected amounts of ground coffee beans and hot water into the brewing apparatus; thereby discharging brewed coffee from the coffee maker. However, because the brewing apparatus includes at least one vertically movable element, there is a need for providing numerous elements to cooperate with the movable element, thereby resulting in a complicated structure for the conventional coffee maker. Furthermore, it is difficult to remove consumed ground coffee from the conventional coffee maker.

SUMMARY OF THE INVENTION

An object of this invention is to provide a brewing apparatus for an electric coffee maker, which has a simple structure and which can remove automatically consumed ground coffee therefrom as soon as a brewing process is finished.

According to this invention, a brewing apparatus for an electric coffee maker includes a plunger unit and a sleeve unit, which can be driven by a driving unit to move horizontally on a machine base. When an unsealed chamber is defined among a coffee-discharging unit, the plunger unit and the sleeve unit, ground coffee beans can be fed automatically into the unsealed chamber. Subsequently, a sealed chamber is defined among the coffee-discharging unit, the plunger unit and the sleeve unit such that the ground coffee beans are received within the sealed chamber thereby permitting flow of hot water from the plunger unit into the sealed chamber. Finally, the plunger unit and the sleeve unit are separated from the coffee-discharging unit, thereby permitting dropping of consumed ground coffee from a space between the coffee-discharging unit and the assembly of the plunger unit and the sleeve unit.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
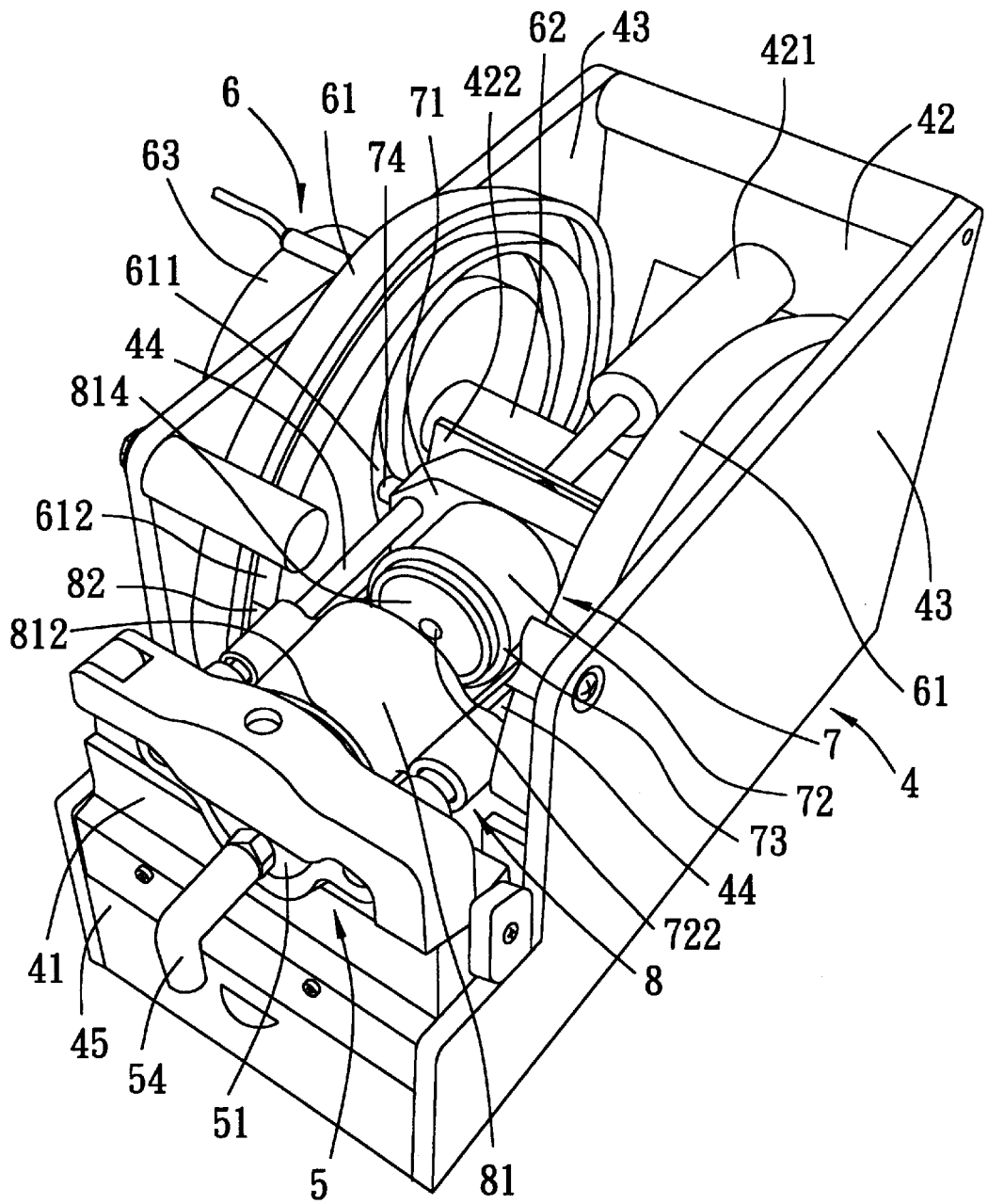
FIG. 1 is a perspective view of the preferred embodiment of a brewing apparatus for an electric coffee maker according to this invention.
Figure 2:
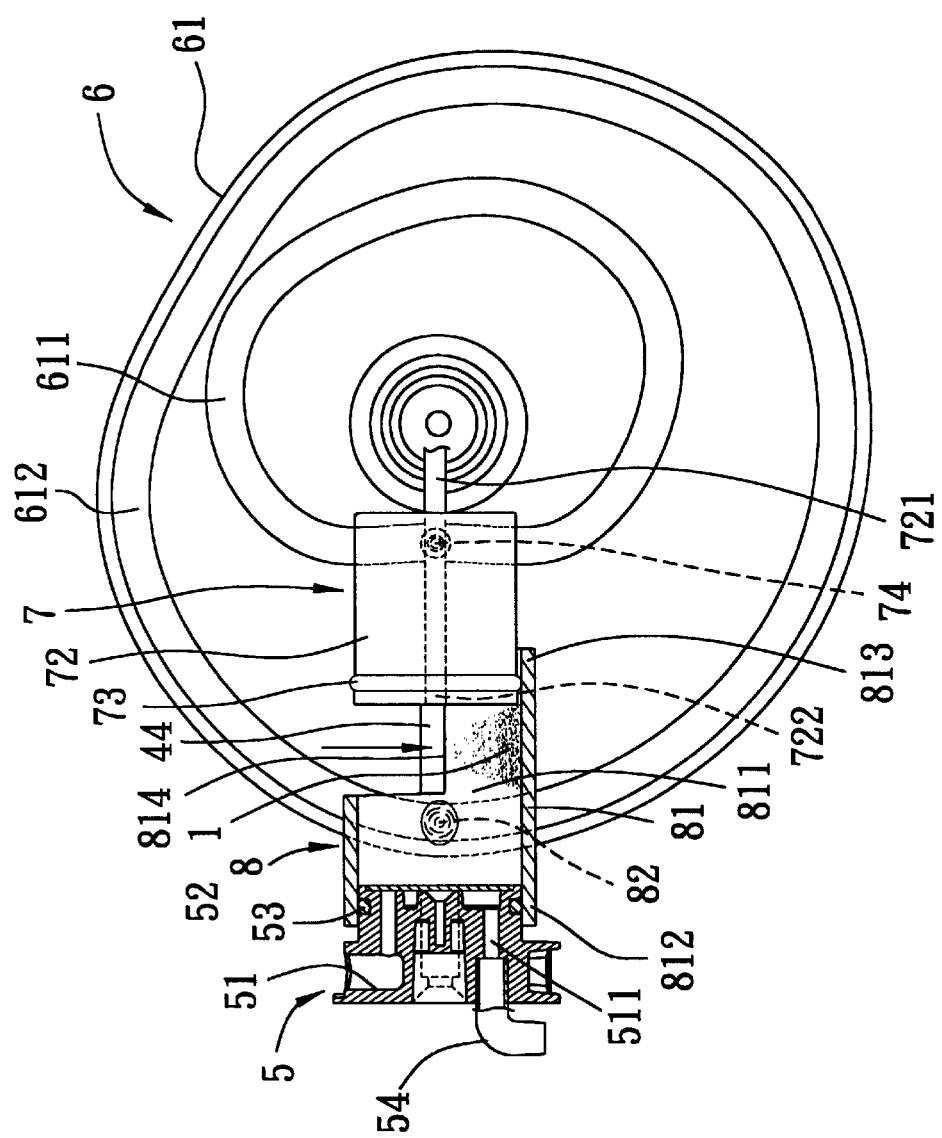
FIG. 2 is a partly sectional view of the preferred embodiment, illustrating how ground coffee beans are fed into an unsealed chamber that is defined among al coffee-discharging unit, a plunger unit and a sleeve unit.
Figure 3:
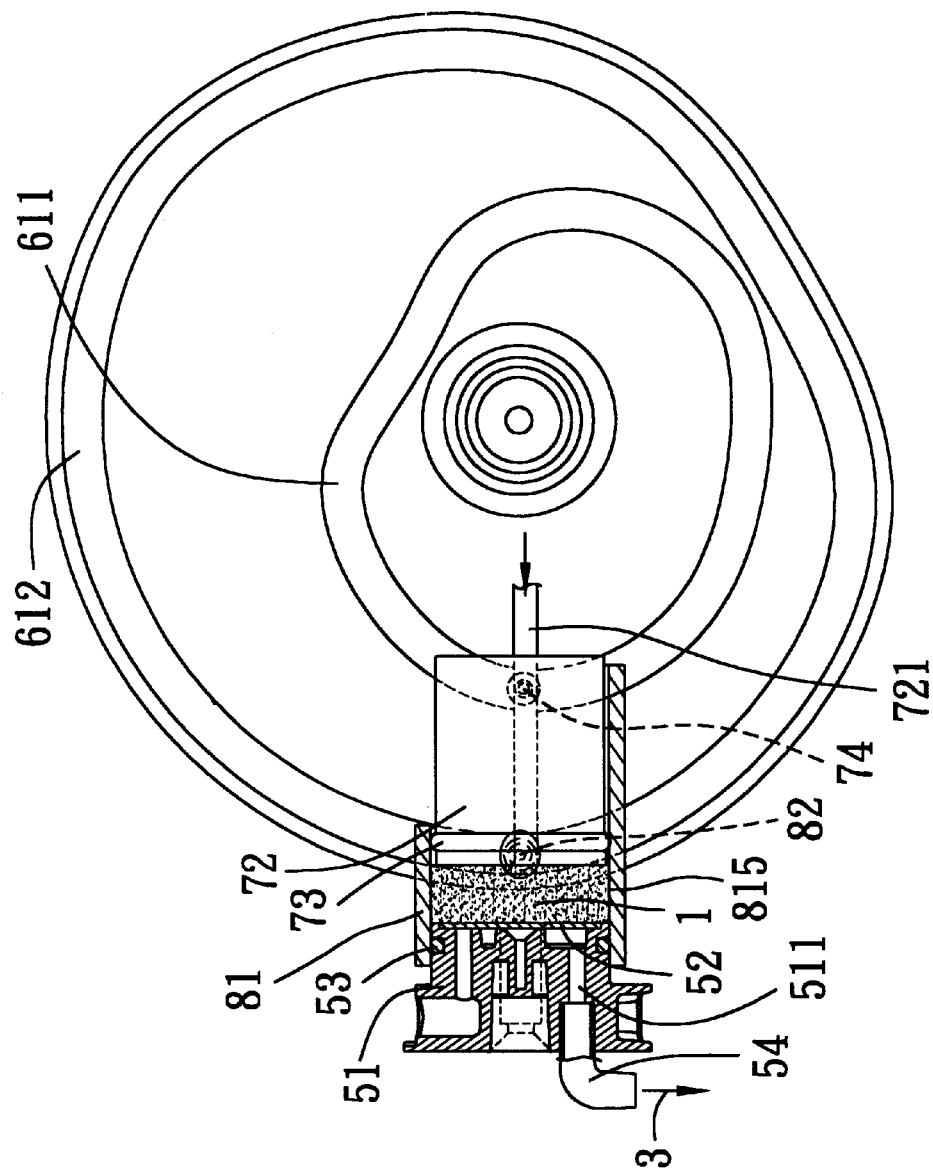
FIG. 3 is a sectional view of the preferred embodiment, illustrating how the ground coffee beans are compressed within a sealed chamber that is defined among the coffee-discharging unit, the plunger unit and the sleeve unit.

Referring to FIGS. 1 and 2, the preferred embodiment of a brewing apparatus for an electric coffee maker according to this invention is shown to include a machine base 4, a coffee-discharging unit 5, a driving unit 61 a hot water-feeding plunger unit 7 and a sleeve unit 8.

The machine base 4 includes a front sleeve portion with a vertical front wall 41, a rear portion with a vertical rear wall 42, and two side walls 43 interconnecting the front and rear walls 41, 42. A supporting rod 421 has a rear end that is fixed to the rear wall 42, and a front end that is fixed to a vertical rod-mounting plate 422. Two parallel horizontal guide rods 44 have front ends that are fixed to the front wall 41, and rear ends that are fixed to the mounting plate 422.

The coffee-discharging unit 5 includes a mounting body 51 that is fixed on the front portion of the machine base 4, a filter net 52, an O-ring 53 that is sleeved on a rear end of the mounting body 51, and a discharge pipe 54 that is adapted to discharge brewed coffee 3 therefrom. A coffee passage 511 is formed through the mounting body 51, and has a front end that is in fluid communication with the discharge pipe 54, and a rear end that is formed in a rear end surface of the mounting body 51. The filter net 52 is fixed to the rear end surface of the mounting body 51 so as to cover the rear end of the coffee passage 511.

The driving unit 6 includes two aligned vertical cam plates 61, a horizontal rotating shaft 62 that interconnects the cam plates 61 fixedly and that extends through one of the side walls 43, and a motor 63, which has a motor shaft (not shown) that is connected fixedly to the rotating shaft 62 so as to rotate the same. Each of the cam plates 61 has an inner side surface, which is formed with an endless inner guide slot 611, and an endless outer guide slot 612 that is located around the inner guide slot 611.

The plunger ,unit 7 is disposed at a first plunger position behind the coffee-discharging unit 5, and includes a bridging member 71 that is sleeved slidably on the guide rods 44, a plunger body 72 that is connected fixedly to the bridging member 71, an O-ring 73 that is sleeved on a front end of the plunger body 72, and two aligned follower rails 74 that extend integrally and outwardly from two opposite sides of the bridging member 71 and that are perpendicular to the guide rods 44. Because the follower rails 74 are received respectively and slidably within the inner guide slots 611 in the cam plates 61, when the cam plates 61 are rotated by the motor 63, the plunger body 72 moves horizontally and reciprocally along the guide rods 44 relative to the machine base 4. A water feeding pipe 721 extends through the center of the plunger body 72, and has a hot-water outlet 722 that is formed in a front end surface of the plunger body 72 and that is adapted to discharge hot water therefrom.

The sleeve unit 8 is disposed at a first sleeve position behind the coffee-discharging unit 5 and in front of the plunger unit 7, and includes a sleeve body 81 that is sleeved slidably on the guide rods 44, and two aligned follower rails 82 that extend integrally and outwardly from two opposite sides of the sleeve body 81 and that are perpendicular to the guide rods 44. The sleeve body 81 has a cylindrical front sleeve portion 812 and a semi-cylindrical rear sleeve portion 813 that is formed integrally with a lower portion of an open rear end of the front sleeve portion 812. The front sleeve portion 812 has an open front end, which is sleeved on the rear end of the coffee-discharging unit 5 in such a manner that the O-ring 53 is disposed therebetween, thereby establishing a liquid-tight seal therebetween. The rear sleeve portion 813 has a rear end, which is sleeved on a front end of the plunger unit 7 in such a manner that the O-ring 73 is disposed therebetween, thereby establishing a liquid-tight seal therebetween. An unsealed chamber 811 is defined among the coffee-discharging unit 5, the plunger unit 7 and the sleeve unit 8. An opening 814 is defined among the front sleeve portion 812, the rear sleeve portion 813 and the plunger unit 7. Because the follower rails 82 are received respectively and slidably within the outer guide slots 612 in the cam plates 61, when the cam plates 61 are rotated by the motor 63, the sleeve body 81 moves horizontally and reciprocally along the guide rods 44 relative to the machine base 4.

When it is desired to brew coffee, under an automatic control, a switch (not shown) is actuated so as to feed the ground coffee beans 1 into the unsealed chamber 811 via the opening 814. Subsequently, referring to FIG. 31 under the automatic control, the driving unit 6 moves the plunger unit 7 and the sleeve unit 8 to a second plunger position and a second sleeve position, respectively where a sealed chamber 815 is defined among the coffee-discharging unit 5, the front sleeve portion 812 and the plunger unit 7 and where the front and rear ends of the sleeve body 81 are sleeved respectively on the rear end of the coffee-discharging unit 5 and the front end of the plunger unit 7. Accordingly, the ground coffee beans 1 are moved forwardly from the rear sleeve portion 813 to the front sleeve portion 812 within the sleeve unit 8 by means of the plunger unit 7, and are compressed within the sealed chamber 815, after which the hot water is fed into the sealed chamber 815 via the water-feeding pipe 721, under the automatic control. As such, the brewed coffee 3 flows through the filter net 52 and the coffee passage 511 in the mounting body 51, and exits from the discharge pipe 54.

Figure 4:
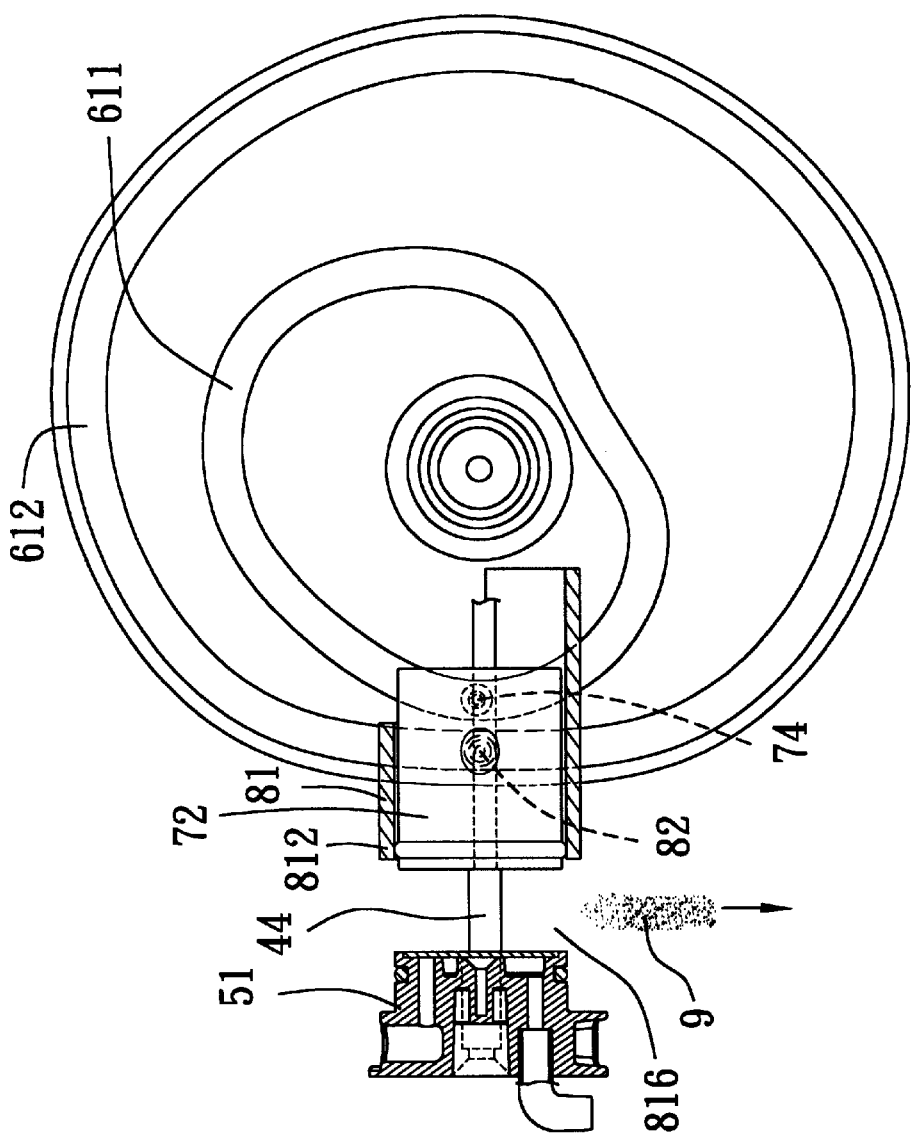
FIG. 4 is a partly sectional view of the preferred embodiment, illustrating how consumed ground coffee drop from a space between the coffee-discharging unit and the assembly of the plunger unit and the sleeve unit.

Finally, referring to FIG. 4, under the automatic control, the driving unit 6 moves the plunger unit 7 and the sleeve unit 8 to a third plunger position and a third sleeve position, respectively, in which both the plunger unit 7 and the sleeve unit 8 separate from the coffee-discharging unit 5, thereby permitting dropping of consumed ground coffee 9 from a space 816 between the coffee-discharging unit 5 and the assembly of the plunger unit 7 and the sleeve unit 8, in which the front end of the front sleeve portion 812 is sleeved on the front end of the plunger unit 7. The consumed ground coffee 9 will drop into a drawer 45 that is disposed slidably on thee machine base 4 and that is located directly under the space 816.

With this invention thus explained, it is apparent that numerous modifications and variations can be made without departing from the scope and spirit of this invention.

It is therefore intended that this invention be limited only as indicated by the appended claims.

I claim:

1. A brewing apparatus for an electric coffee maker, said brewing apparatus comprising:
    a machine base having a front portion and a rear portion;
    a coffee-discharging unit disposed on said front portion of said machine base and including a discharge pipe that Is adapted to discharge brewed coffee therefrom;
    a driving unit disposed on said machine base;
    a hot water-feeding plunger unit disposed horizontally and movably on said machine base and capable of being driven by said driving unit to move on said machine base among a first plunger position, a second plunger position and a third plunger position, said plunger unit being formed with a hot-water outlet that is adapted to discharge hot water therefrom;
    a sleeve unit disposed horizontally and movably on said machine base and capable of being driven by said driving unit to move on said machine base among a first sleeve position, where said plunger unit is disposed at said first plunger position so that an unsealed chamber are defined among said coffee-discharging unit, said plunger unit and said sleeve unit such that ground coffee beans can be fed into said unsealed chamber, a second sleeve position, where said plunger unit is disposed at said second plunger position so that a sealed chamber is defined among said coffee-discharging unit, said plunger unit and said sleeve unit such that the ground coffee beans are received within said sealed chamber, thereby permitting flow of the hot water from said hot-water outlet in said plunger unit into said sealed chamber so as to result in consumed ground coffee in said sealed chamber and brewed coffee that in turn flows into said coffee-discharging unit, and a third sleeve position, where said plunger unit is disposed at said third plunger position so as to separate both said plunger unit and said sleeve unit from said coffee-discharging unit, thereby permitting dropping of the consumed ground coffee from a space between said coffee-discharging unit and assembly of said plunger unit and said sleeve unit; and
    wherein said sleeve unit is disposed behind said coffee-discharging unit and in front of said plunger unit, and includes:
        a cylindrical front sleeve portion having an open front end, which is sleeved on a rear portion of said coffee-discharging unit in such a manner that a liquid-tight seal is established therebetween when said sleeve unit is disposed at said first and second sleeve positions, and which is spaced apart from said coffee-discharging unit so as to be sleeved on a front end of said plunger unit when said sleeve unit is disposed at said third sleeve position, an open rear end sleeved on said front end of said plunger unit in such a manner that a liquid-tight seal is established therebetween when said sleeve unit is disposed at said second sleeve position, said open rear end having a lower portion; and
        a semi-cylindrical rear sleeve portion having a front end, which is formed integrally with said lower portion of said rear end of said front sleeve portion, and a rear end, which is sleeved on said front end of said plunger unit in such a manner that a liquid-tight seal is established therebetween when said sleeve unit is disposed at said first sleeve position.

2. The brewing apparatus as claimed in claim 1, wherein said coffee-discharging unit includes:
    a rear end surface,
    a coffee passage having a front end that is in fluid communication with said discharge pipe, and a rear end that is formed in said rear end surface; and
    a filter net fixed to said rear end surface so as to cover said rear end of said coffee passage.

3. A brewing apparatus for an electric coffee maker, said brewing apparatus comprising:
    a machine base having a front portion and a rear portion;
    a coffee-discharging unit disposed on said front portion of said machine base and including a discharge pipe that is adapted to discharge brewed coffee therefrom;

a driving unit disposed on said machine base;

a hot water-feeding plunger unit disposed horizontally and movably on said machine base and capable of being driven by said driving unit to move on said machine base among a first plunger position, a second plunger position and a third plunger position, said plunger unit being formed with a hot-water outlet that is adapted to discharge hot water therefrom;

a sleeve unit disposed horizontally and movably on said machine base and capable of being driven by said driving unit to move on said machine base among a first sleeve position, where said plunger unit is disposed at said first plunger position so that an unsealed chamber are defined among said coffee-discharging unit, said plunger unit and said sleeve unit such that ground coffee beans can be fed into said unsealed chamber, a second sleeve position, where said plunger unit is disposed at said second plunger position so that a sealed chamber is defined among said coffee-discharging unit, said plunger unit and said sleeve unit such that the ground coffee beans are received within said sealed chamber, thereby permitting flow of the hot water from said hot-water outlet in said plunger unit into said sealed chamber so as to result in consumed ground coffee in said sealed chamber and brewed coffee that in turn flows into said coffee-discharging unit, and a third sleeve position, where said plunger unit is disposed at said third plunger position so as to separate both said plunger unit and said sleeve unit from said coffee-discharging unit, thereby permitting dropping of the consumed ground coffee from a space between said coffee-discharging unit and assembly of said plunger unit and said sleeve unit; horizontal guide rods, which are disposed fixedly on said machine base so that said plunger unit and said sleeve unit are sleeved movably on said guide rods, thereby guiding said plunger unit and said sleeve unit to move forward and rearward relative to said machine base; and wherein each of said plunger unit and said sleeve unit is formed integrally with a follower rail that is perpendicular to said guide rods, said driving unit including:

a vertical cam plate disposed rotatably on said machine base and rotatable about a horizontal axis, said cam plate having a side surface, which is formed with an endless inner guide slot and an endless outer guide slot that is located around said inner guide slot, said follower rails of said plunger unit and said sleeve unit being received respectively and slidably within said inner and outer guide slots so that rotation of said cam plate results in horizontal reciprocal movement of said plunger unit and said sleeve unit relative to said coffee-discharging unit; and a motor disposed on said machine base and connected operatively to said cam plate so as to rotate said cam plate.

4. A brewing apparatus for an electric coffee maker, said brewing apparatus comprising:

a machine base having a front portion and a rear portion;

a coffee-discharging unit disposed on said front portion of said machine base and including a discharge pipe that is adapted to discharge brewed coffee therefrom;

a driving unit disposed on said machine base, a hot water-feeding plunger unit disposed horizontally and movably on said machine base and capable of being driven by said driving unit to move on said machine base among a first plunger position, a second plunger position and a third plunger position, said plunger unit being formed with a hot-water outlet that is adapted to discharge hot water therefrom;

a sleeve unit disposed horizontally and movably on said machine base and capable of being driven by said driving unit to move on said machine base among a first sleeve position, where said plunger unit is disposed at said first plunger position so that an unsealed chamber are defined among said coffee-discharging unit, said plunger unit and said sleeve unit such that ground coffee beans can be fed into said unsealed chamber, a second sleeve position, where said plunger unit is disposed at said second plunger position so that a sealed chamber is defined among said coffee-discharging unit, said plunger unit and said sleeve unit such that the ground coffee beans are received within said sealed chamber, thereby permitting flow of the hot water from said hot-water outlet in said plunger unit into said sealed chamber so as to result in consumed ground coffee in said sealed chamber and brewed coffee that in turn flows into said coffee-discharging unit, and a third sleeve position, where said plunger unit is disposed at said third plunger position so as to separate both said plunger unit and said sleeve unit from said coffee-discharging unit, thereby permitting dropping of the consumed ground coffee from a space between said coffee-discharging unit and assembly of said plunger unit and said sleeve unit; a drawer, which is disposed slidably on said machine base and which is located directly under said space between said coffee-discharging unit and said assembly of said plunger unit and said sleeve unit so as to be adapted to receive the consumed ground coffee when said sleeve unit is disposed at said third sleeve position.

\* \* \* \* \*